US010405334B2

(12) United States Patent
Patel et al.

(10) Patent No.: US 10,405,334 B2
(45) Date of Patent: Sep. 3, 2019

(54) TECHNIQUES FOR SWITCHING BETWEEN DOWNLINK AND UPLINK COMMUNICATIONS

(71) Applicant: QUALCOMM Incorporated, San Diego, CA (US)

(72) Inventors: Shimman Arvind Patel, San Diego, CA (US); Wanshi Chen, San Diego, CA (US); Juan Montojo, San Diego, CA (US); Hao Xu, San Diego, CA (US); Aleksandar Damnjanovic, Del Mar, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 15/295,328

(22) Filed: Oct. 17, 2016

(65) Prior Publication Data
US 2017/0181182 A1    Jun. 22, 2017

Related U.S. Application Data

(60) Provisional application No. 62/269,674, filed on Dec. 18, 2015.

(51) Int. Cl.
*H04W 72/12* (2009.01)
*H04W 72/04* (2009.01)
(Continued)

(52) U.S. Cl.
CPC ...... *H04W 72/1231* (2013.01); *H04B 7/0626* (2013.01); *H04B 17/336* (2015.01);
(Continued)

(58) Field of Classification Search
CPC . H04W 72/04; H04W 72/042; H04W 72/044; H04W 72/082; H04W 72/121;
(Continued)

(56) References Cited

U.S. PATENT DOCUMENTS

2008/0232278 A1* 9/2008 Brunel ............... H04B 7/2681
370/275
2009/0175232 A1* 7/2009 Kolding ............... H04L 1/0027
370/329
(Continued)

FOREIGN PATENT DOCUMENTS

EP    1 821 429 A2    8/2007
EP    2 418 784 A2    2/2012
(Continued)

OTHER PUBLICATIONS

International Search Report and Written Opinion—PCT/US2016/058504—ISA/EPO—Feb. 15, 2017 (161457WO). 12 pages.

*Primary Examiner* — Peter Chen
(74) *Attorney, Agent, or Firm* — Anthony R. Morris

(57) ABSTRACT

Various aspects described herein relate to scheduling resources in wireless communications. In one aspect, communications can be established with a plurality of user equipment (UE). A set of the plurality of UEs as having an interference impact on one another that is less than a threshold can be determined. A first UE of the set of the plurality of UEs can be scheduled for downlink communications in a first transmission time interval (TTI), and a second UE of the set of the plurality of UEs can be scheduled for uplink communications in a second TTI that is adjacent in time to the first TTI. In another aspect, uplink communications for the first UE can be scheduled in a portion of the guard period TTI based at least in part on determining a timing advance of the first UE is less than a threshold.

30 Claims, 11 Drawing Sheets

(51) Int. Cl.
  *H04W 56/00* (2009.01)
  *H04L 5/00* (2006.01)
  *H04B 17/336* (2015.01)
  *H04B 7/06* (2006.01)

(52) U.S. Cl.
  CPC ......... *H04L 5/0048* (2013.01); *H04W 56/003* (2013.01); *H04W 72/0446* (2013.01); *H04W 72/121* (2013.01); *H04W 72/1268* (2013.01); *H04W 72/1273* (2013.01)

(58) Field of Classification Search
  CPC ......... H04W 72/0446; H04W 72/0413; H04W 72/0406; H04W 72/1231; H04W 72/1289; H04W 72/1268; H04W 72/1284; H04W 72/1273; H04W 72/1278; H04W 56/003; H04L 5/0048; H04B 7/0626; H04B 17/336
  See application file for complete search history.

(56) References Cited

U.S. PATENT DOCUMENTS

| | | | |
|---|---|---|---|
| 2013/0034035 A1* | 2/2013 | Kazmi | H04W 56/0085 370/311 |
| 2013/0324113 A1* | 12/2013 | Jechoux | H04W 88/06 455/426.1 |
| 2014/0269460 A1* | 9/2014 | Papasakellariou | H04L 5/1469 370/294 |
| 2016/0044681 A1* | 2/2016 | Zhou | H04L 5/0051 370/329 |
| 2016/0150492 A1 | 5/2016 | Wang | |
| 2017/0290008 A1* | 10/2017 | Tooher | H04W 72/0446 |

FOREIGN PATENT DOCUMENTS

| | | |
|---|---|---|
| EP | 2 779 727 A1 | 9/2014 |
| WO | WO-2008/088255 A1 | 7/2008 |
| WO | WO-2014/200758 A1 | 12/2014 |
| WO | WO-2015/039308 A1 | 3/2015 |

* cited by examiner

TECHNIQUES FOR SWITCHING BETWEEN DOWNLINK AND UPLINK COMMUNICATIONS

CLAIM OF PRIORITY UNDER 35 U.S.C. § 119

The present application for Patent claims priority to Provisional Application No. 62/269,674 entitled "TECHNIQUES FOR SWITCHING BETWEEN DOWNLINK AND UPLINK COMMUNICATIONS" filed Dec. 18, 2015, which is assigned to the assignee hereof and hereby expressly incorporated by reference herein for all purposes.

BACKGROUND

Described herein are aspects generally related to communication systems, and more particularly, to switching between downlink and uplink wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, further improvements in LTE technology may be desired. Preferably, these improvements should be applicable to other multi-access technologies and the telecommunication standards that employ these technologies.

In wireless communication systems employing legacy LTE, a plurality of UEs served by a particular eNodeB may be scheduled resources for communicating with the eNodeB over one or more channels using transmission time intervals (TTI) on the order of a 1 millisecond subframe. As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for scheduling resources in wireless communications is provided. The method includes establishing communications with a plurality of user equipment (UE), determining a set of the plurality of UEs as having an interference impact on one another that is less than a threshold, scheduling a first UE of the set of the plurality of UEs for downlink communications in a first transmission time interval (TTI), and scheduling a second UE of the set of the plurality of UEs for uplink communications in a second TTI that is adjacent in time to the first TTI.

In another example, an apparatus for scheduling resources in wireless communications is provided. The apparatus includes a transceiver for communicating one or more wireless signals via one or more antennas, a memory configured to store instructions, and one or more processors communicatively coupled with the transceiver and the memory. The one or more processors are configured to establish communications with a plurality of UEs, determine a set of the plurality of UEs as having an interference impact on one another that is less than a threshold, schedule a first UE of the set of the plurality of UEs for downlink communications in a first TTI, and schedule a second UE of the set of the plurality of UEs for uplink communications in a second TTI that is adjacent in time to the first TTI.

In another example, an apparatus for scheduling resources in wireless communications is provided. The apparatus includes means for establishing communications with a plurality of UEs, means for determining a set of the plurality of UEs as having an interference impact on one another that is less than a threshold, means for scheduling a first UE of the set of the plurality of UEs for downlink communications in a first TTI, and means for scheduling a second UE of the set of the plurality of UEs for uplink communications in a second TTI that is adjacent in time to the first TTI.

Still, in another example, a computer-readable medium including code executable for scheduling resources in wireless communications is provided. The code includes code for establishing communications with a plurality of UEs, code for determining a set of the plurality of UEs as having an interference impact on one another that is less than a threshold, code for scheduling a first UE of the set of the plurality of UEs for downlink communications in a first TTI, and code for scheduling a second UE of the set of the plurality of UEs for uplink communications in a second TTI that is adjacent in time to the first TTI.

In other aspects, a method for reporting a timing offset by a UE in wireless communications is provided. The method includes receiving, at a first UE, a request from an access point to measure a reference signal transmitted by a second UE, determining a first timing associated with communications from the access point, measuring a second timing of the reference signal transmitted by the second UE, reporting, to the access point, a timing offset between the first timing and the second timing, and receiving a resource allocation for downlink communications from the access point based at least in part on reporting the timing offset.

In another example, an apparatus for reporting a timing offset in wireless communications is provided. The apparatus includes a transceiver for communicating one or more wireless signals via one or more antennas, a memory configured to store instructions, and one or more processors communicatively coupled with the transceiver and the memory. The one or more processors are configured to receive, at a first UE, a request from an access point to measure a reference signal transmitted by a second UE, determine a first timing associated with communications from the access point, measure a second timing of the reference signal transmitted by the second UE, report, to the access point, a timing offset between the first timing and the second timing, and receive a resource allocation for downlink communications from the access point based at least in part on reporting the timing offset.

In another example, an apparatus for reporting a timing offset in wireless communications is provided. The apparatus includes means for receiving, at a first UE, a request from an access point to measure a reference signal transmitted by a second UE, means for determining a first timing associated with communications from the access point, means for measuring a second timing of the reference signal transmitted by the second UE, means for reporting, to the access point, a timing offset between the first timing and the second timing, and means for receiving a resource allocation for downlink communications from the access point based at least in part on reporting the timing offset.

Still, in another example, a computer-readable medium including code executable for reporting a timing offset in wireless communications is provided. The code includes code for receiving, at a first UE, a request from an access point to measure a reference signal transmitted by a second UE, code for determining a first timing associated with communications from the access point, code for measuring a second timing of the reference signal transmitted by the second UE, code for reporting, to the access point, a timing offset between the first timing and the second timing, and code for receiving a resource allocation for downlink communications from the access point based at least in part on reporting the timing offset.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
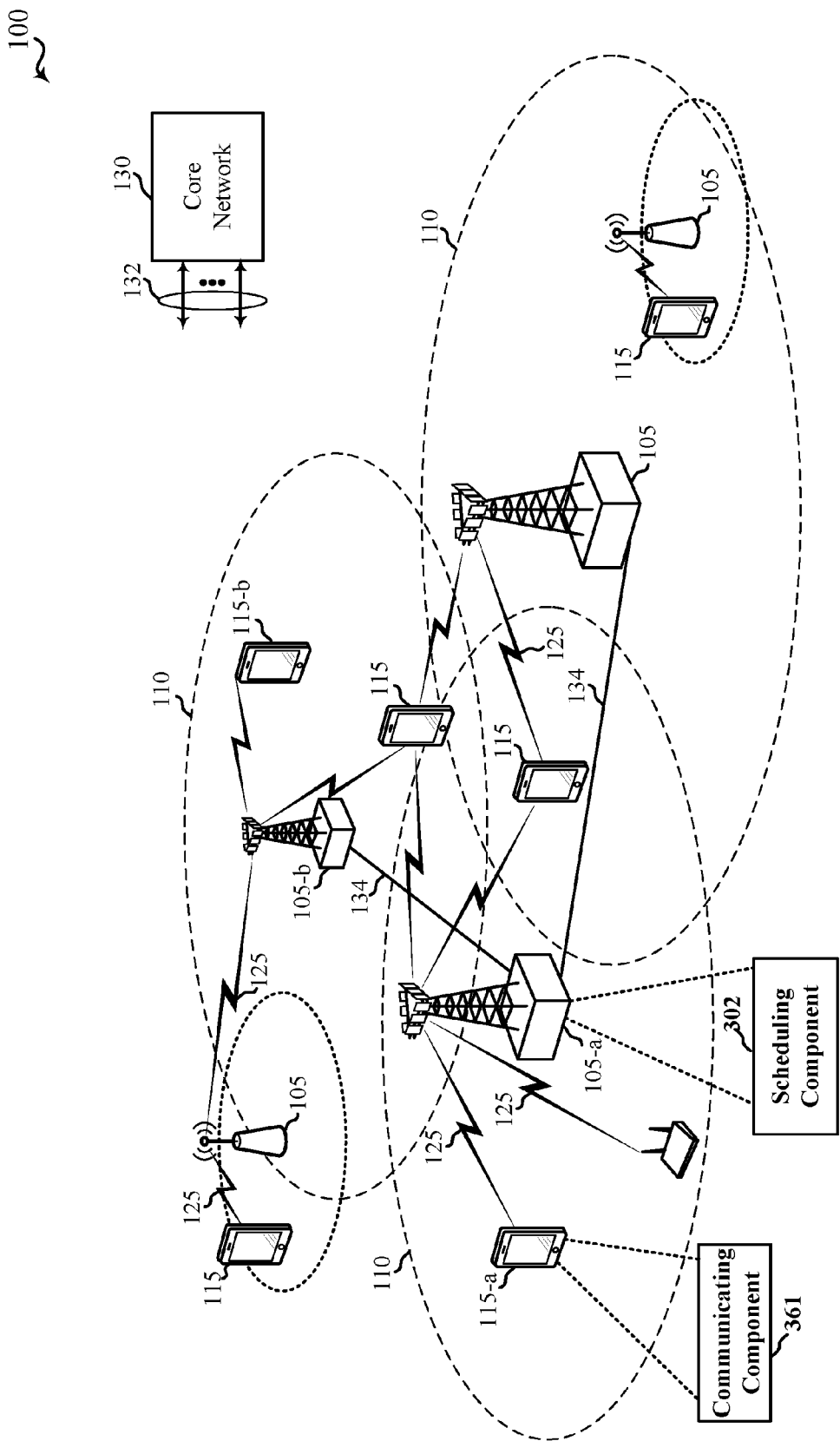
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to switching communications between downlink and uplink communications in an ultra low latency (ULL) communication technology. For example, a ULL communication technology may be a communication technology that is based on a legacy wireless communication technology, but may utilize different length transmission time intervals (TTI) than the legacy wireless communication technology. In a specific example, the legacy communication technology may include third generation partnership project (3GPP) long term evolution (LTE), and the ULL communication technology may be based on or otherwise similar to LTE, but may have a shorter TTI duration than LTE. For example, a legacy LTE technology may utilize a TTI having a duration of a subframe defined in LTE (e.g., 1 millisecond), where an ultra low latency (ULL) LTE technology can be based on a TTI having a duration less than a subframe (e.g., one symbol, two symbols, a subframe slot, etc.). In this regard, a lower latency in communications is achieved by the shorter, more frequent TTI.

In time division duplexing (TDD) LTE systems, a guard period (GP) between switching from downlink to uplink communications in a frame can be provided to mitigate interference from downlink communications to uplink communications near the time of the switching. The GP is typically sized to account for a worst case edge-of-cell round trip time delay. This can guarantee that there is no collision between downlink and uplink traffic across a set of cell users. The GP can impact efficiency of the system, however, as no communications occur over the GP. Previous attempts to optimize the GP overhead include reducing the downlink to uplink switch rate to be 5 ms or 10 ms in LTE, and providing multiple special subframe configurations to allow for optimization of the GP for various cell sizes. For a typical special subframe configuration 1, with a downlink pilot time slot (DwPTS)=19760$T_s$ and an uplink pilot time slot (UpPTS)=5120$T_s$, where $T_s$ is a number of samples, and a downlink/uplink switch periodicity of 10 ms, as defined in LTE, the GP overhead amounts to ~2.1% of overall transmission time.

As the TTI becomes shorter, as in ULL LTE for example, the GP sized in this regard may become a larger percentage of overall transmission time, and thus may result in significant overhead to communications. For example, assuming one downlink to uplink switch in every subframe (e.g., based on a symbol, two-symbol, slot, etc. TTI), if the GP is one symbol (e.g., one orthogonal frequency division multiplexing (OFDM), single carrier frequency division multiplexing (SC-FDM), etc. symbol) in duration, the overhead ratio in ULL LTE is $1/14$=~7% for normal cyclic prefix (CP), which can correspond to an eNB to UE distance of ~10.7 km. For larger GP durations (e.g., two-symbol GP, three-symbol GP, four-symbol GP, etc.), the overhead continues to increase (e.g., ~14%, ~21%, ~29%, respectively).

Accordingly, in one example, an evolved Node B (eNB) can schedule communications between user equipment (UE) such to allow reduction or elimination of the GP. For example, the eNB can determine sets of UEs having a potential interference impact on one another that is less than a threshold. In a given frame (or subframe in ULL communications), the eNB can schedule downlink communications to one or more UEs in the set in one TTI and can schedule uplink communications to one or more other UEs in the set in the next TTI (and/or vice versa) without using a GP. In an example, the sets of UEs can be pairs of UEs (e.g., in time division multiplexing (TDM)) where one UE is scheduled for uplink or downlink communications in a given TTI. In this example, the eNB may request the one or more other UEs in the set to measure signals transmitted by the one or more UEs in the set (and/or may request the one or more UEs in the set to transmit the signals). The one or more other UEs can measure the signals and report a timing offset between a first timing of the measured signals for a given symbol and a second timing of signals received from the eNB. The one or more other UEs may additionally report a signal-to-interference-and-noise ratio (SINR) based on a received signal power (e.g., received signal strength indicator (RSSI), reference signal received power (RSRP), reference signal received quality (RSRQ), etc.) of the signals to indicate interference of the one or more UEs. The eNB may use this information to determine the sets of UEs. For example, the eNB may group or pair UEs as having an interference impact on one another that is less than a threshold where the reported offset is less than a threshold, the SINR is less than a threshold, and/or the like. Accordingly, when switching from downlink to uplink communications in a subframe (and/or vice versa), the eNB can schedule one of the UEs in the pair or set for downlink communications in one TTI, and another UE in the pair or set for uplink communications in the next TTI without a GP.

In another example, the eNB may reduce the GP by scheduling the same UE for downlink communications in one TTI and for uplink communications in a latter portion of the next TTI, where the initial portion of the TTI can be a GP. In this example, the eNB may determine the UE that is capable of a smaller GP, which may be based on determining a timing advance for the UE as being less than a threshold, determining a distance of the UE to the eNB as being less than a threshold, etc.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of UEs 115, and a core network 130. Access points 105 may include a scheduling component 302 configured to allocate resources for communicating with UEs 115 using a ULL communication technology. Similarly, one or more of UEs 115 may include a communicating component 361 configured to communicate with one or more access points 105 using the ULL communication technology (e.g., ULL LTE). Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples, a hybrid UE 115-a may communicate with access point 105-a on both a first hierarchical layer that supports first layer transmissions using a first TTI (which may relate to a "legacy communication technology") and a second hierarchical layer that supports second layer transmissions using a second TTI, which may be shorter than the first TTI (which may relate to a "ULL communication technology").

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of subframes of the second subframe type. Access point 105-b may transmit communications related to the first or second hierarchical layer only or may transmit communications for both the first and second hierarchical layers. Where an access point 105-b supports both the first and second hierarchical layers, communicating component 361 can be configured to prioritize communications received from the access point 105-b that relate to the first and second hierarchical layers, as described herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In network communication systems using LTE/LTE-A and/or ULL LTE communication technologies, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
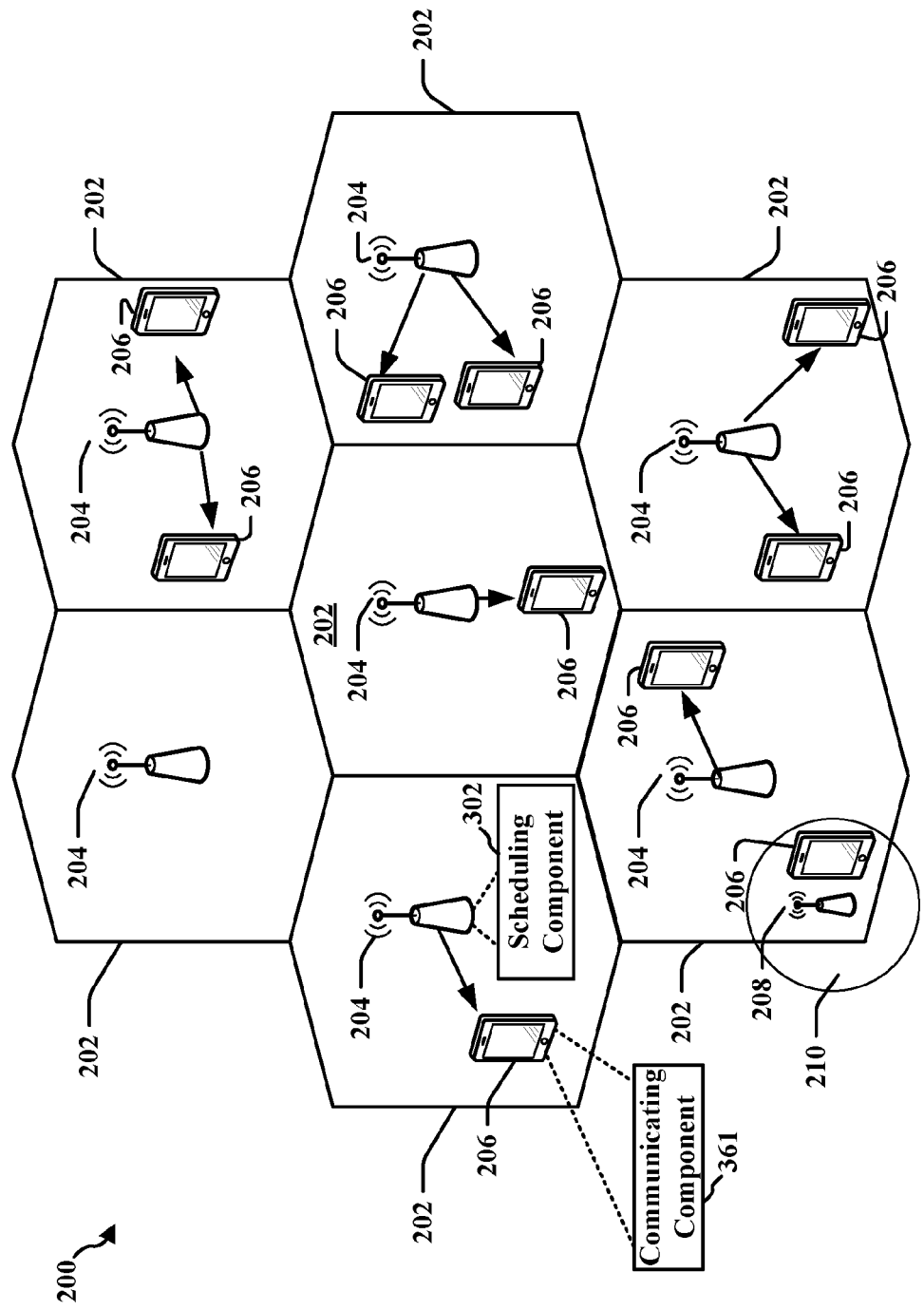
FIG. 2 is a diagram illustrating an example of an access network.

FIG. 2 is a diagram illustrating an example of an access network 200 in an LTE or ULL LTE network architecture. In this example, the access network 200 is divided into a number of cellular regions (cells) 202. One or more small cell eNBs 208 may have cellular regions 210 that overlap with one or more of the cells 202. The small cell eNBs 208 may provide one or more cells of a lower power class, such as a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 and/or 208 may include scheduling component 302 configured to allocate resources for communicating with UEs 206 using a ULL communication technology. Similarly, one or more of UEs 206 may include a communicating component 361 configured to communicate with one or more eNBs 204 and/or 208 using the ULL communication technology (e.g., ULL LTE). There is no centralized controller in this example of an access network 200, but a centralized controller may be used in alternative configurations. The eNBs 204 may be responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
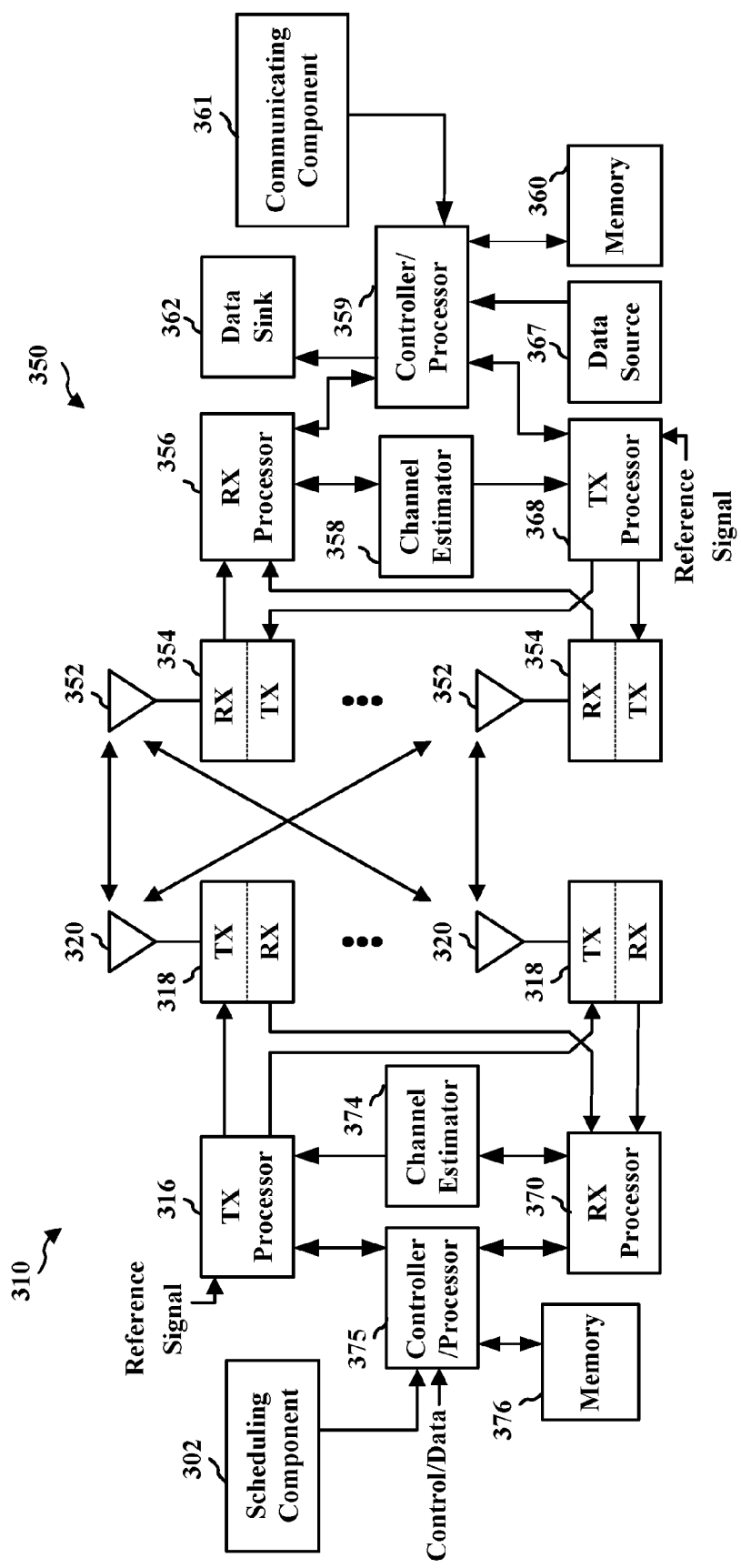
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

In addition, eNB 310 may include scheduling component 302 configured to allocate resources for communicating with a UE 350 using a ULL communication technology. In an example, though scheduling component 302 is shown as coupled with controller/processor 375, substantially any processor of an eNB 310 can provide the functions of the scheduling component 302 and/or its related components described herein (e.g., in conjunction with controller/processor 375, memory 376, or otherwise). For example, TX processor 316 and/or RX processor 370 can additionally or alternatively provide one or more functions of scheduling component 302, as described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In addition, UE 350 may include communicating component 361 configured to communicate with one or more access points, such as eNB 310, using the ULL communication technology (e.g., ULL LTE). In an example, though communicating component 361 is shown as coupled with controller/processor 359, substantially any processor of a UE 350 can provide the functions of the communicating component 361 and/or its related components described herein (e.g., in conjunction with controller/processor 359, memory 360, or otherwise). For example, TX processor 368 and/or RX processor 356 can additionally or alternatively provide one or more functions of communicating component 361, as described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
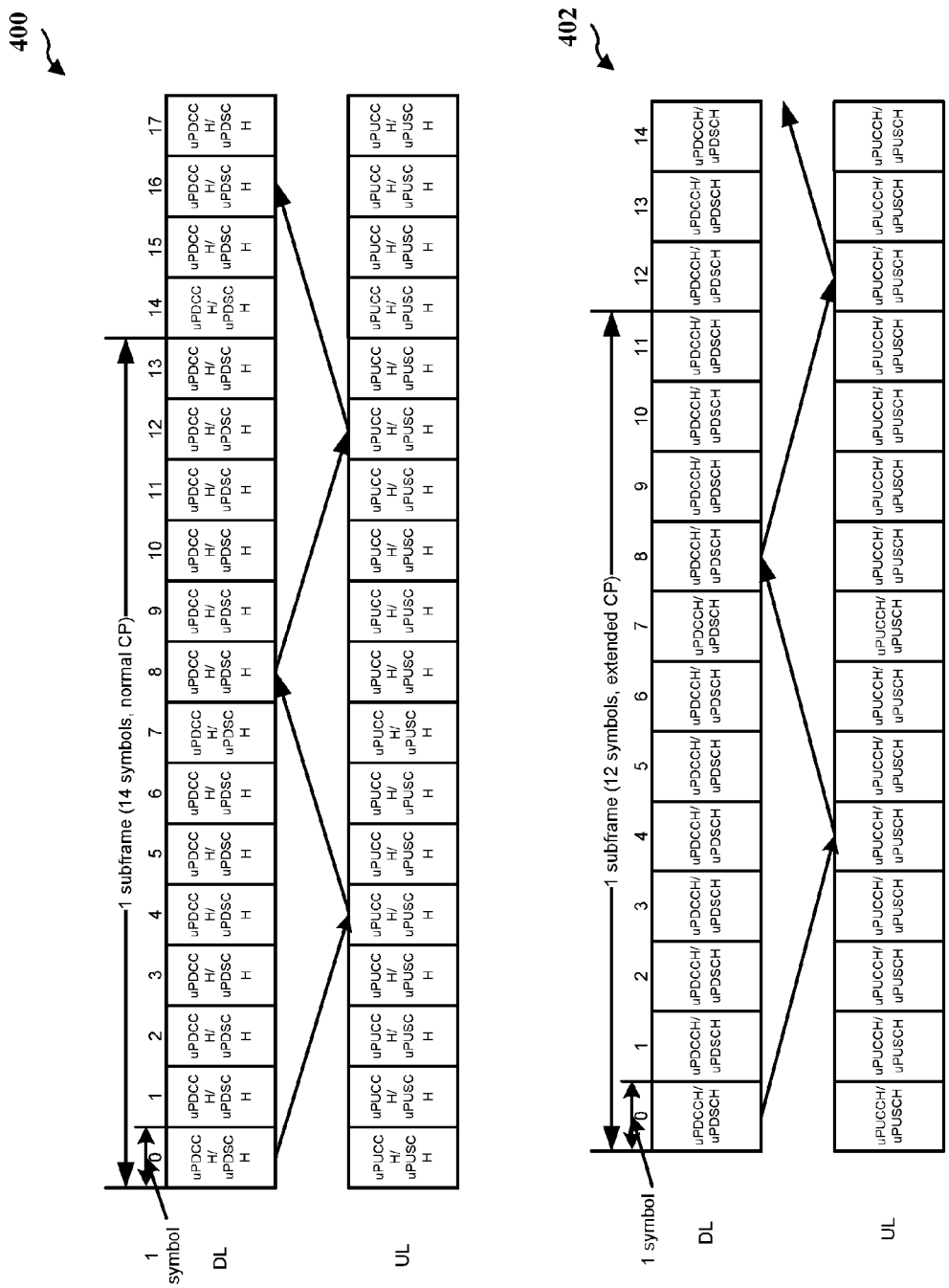
FIG. 4 is a diagram illustrating examples of timelines for ultra low latency (ULL) bandwidth allocation.

FIG. 4 is a diagram illustrating non-limiting examples of a ULL timelines 400, 402, with time progression extending from left to right in the figure, for managing ULL communications in a wireless communication system. In this example, timelines 400, 402 include ULL frames of symbol duration in each symbol of a subframe. Timelines 400, 402 both depict symbols representing a TTI for ULL physical downlink control channel (uPDCCH) and/or ULL physical downlink shared channel (uPDSCH) and symbols representing a TTI including ULL physical uplink control channel (uPUCCH) and/or ULL physical uplink shared channel (uPUSCH). In timelines 400, 14 symbols are shown within a given subframe (e.g., for normal CP), and in timelines 402, 12 symbols are shown within a given subframe (e.g., for extended CP). In either case, lower latency is achieved in ULL by utilizing symbol-based TTIs. In other examples, a TTI may be two or more symbols, a slot of a subframe (where a subframe includes two slots), etc. In addition, HARQ process response time can be 3 symbols (or 4 symbols, 3 dual-symbols, 3 slots, etc.). In the depicted example, uPDCCH/uPDSCH is sent in symbol 0, and HARQ is processed and is sent in symbol 4, etc. in the subframe. Moreover, in accordance with aspects described herein, for example, some symbols within a given subframe can be allocated for downlink communications (e.g., uPDCCH/uPDSCH) while other symbols are allocated for uplink communications (e.g., uPUCCH/uPUSCH).

Figure 5:
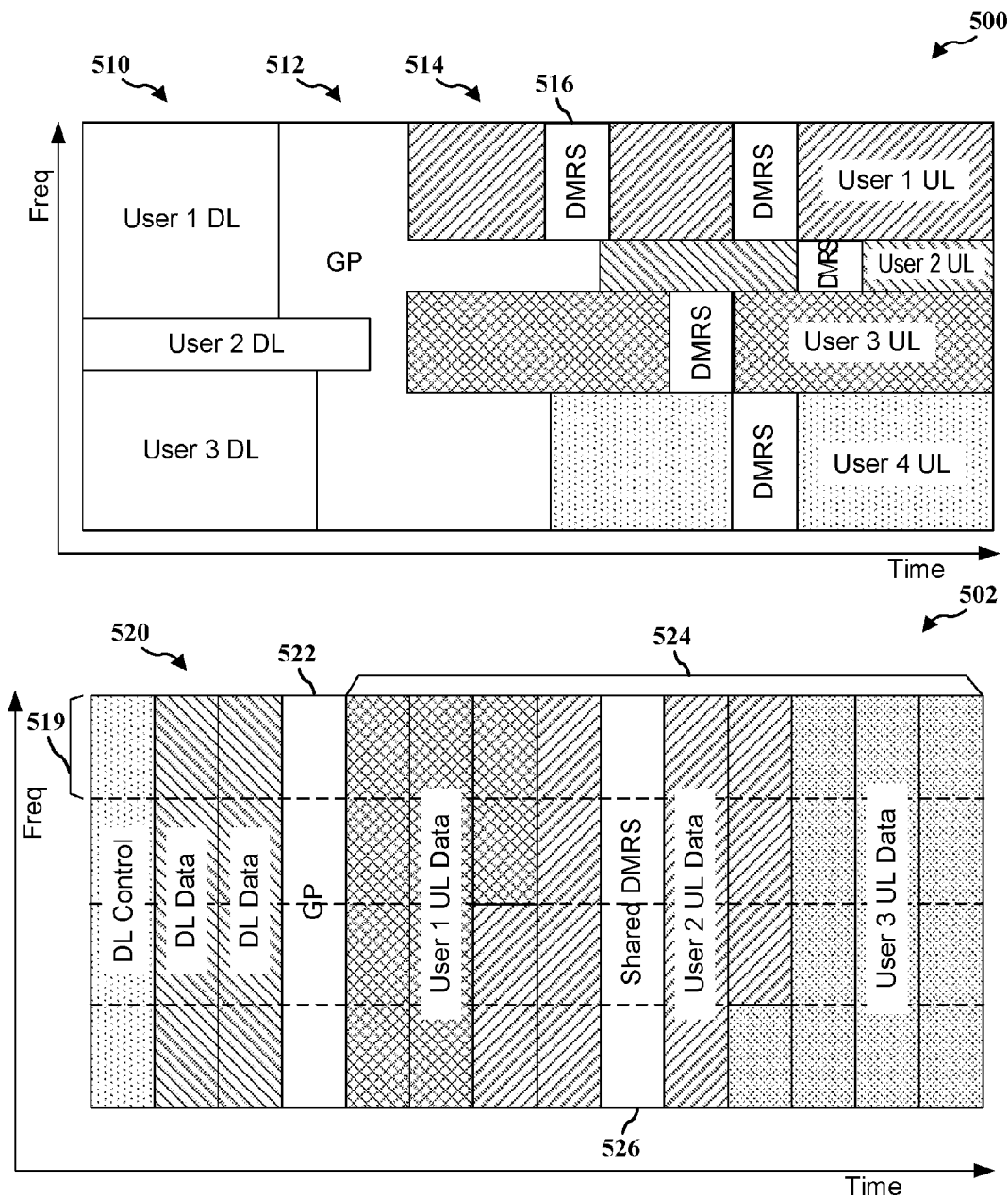
FIG. 5 is a diagram illustrating examples of allocation spaces for uplink channel allocation.

FIG. 5 is a diagram illustrating non-limiting examples of resource allocations over allocation spaces 500 and 502 in ULL wireless communications. The resource allocations in allocation spaces 500 and/or 502 can be determined and/or allocated by an eNB (e.g., via a scheduling component 302) for one or more UEs, as described herein, and can include downlink and/or uplink resources.

In allocation space 500, resources are allocated in FDM such that a given portion of frequency (represented vertically in FIG. 5) can be allocated to a given UE over a portion of time (represented horizontally in FIG. 5). In this example, resources over a given frequency are assigned for downlink channels in first portions of time 510 followed by a GP in second portions of time 512 where no resources are allocated, followed by resources over given frequencies assigned for uplink channels in third portions of time 514. In an example, as shown, that different portions of frequency can be allocated over different portions of time for the downlink channels, GPs, and uplink channels. In an example, the downlink channels can correspond to uPDSCH and the uplink channels can correspond to uPUSCH. In addition, in an example, resources can be allocated for transmitting demodulation reference signals (DM-RS) 516 within the resources for the uPUSCH allocation, which can include transmitting the DM-RS 516 in one or more symbols, over multiple non-contiguous symbols, etc.

In allocation space 502, resources are allocated in TDM such that a number of contiguous resource block (RB) groups 519 can be allocated to one or more UEs for ULL communications. Allocation space 502 can include a plurality of RB groups 519 of frequency over one or more periods of time (e.g., a symbol). In one example, in a 20 MHz frequency band, allocation space 502 can be divided into four (4) 5 MHz portions over a plurality of symbols, where each RB group 519 corresponds to 5 MHz (e.g., which may include 25 RBs) over a symbol. In this example, a first number of periods of time 520 (e.g., symbols) can be allocated for downlink communications, followed by one or more periods of time 522 as a GP, followed by one or more periods of time 524 for allocating uplink communications. In this example, periods of time 524 can be allocated to different UEs. Moreover, a period of time 526 within periods of time 524 can be allocated for transmitting DM-RS by one or more UEs (e.g., the UE DM-RS transmissions can be multiplexed over frequency in the period of time 526).

Figure 6:
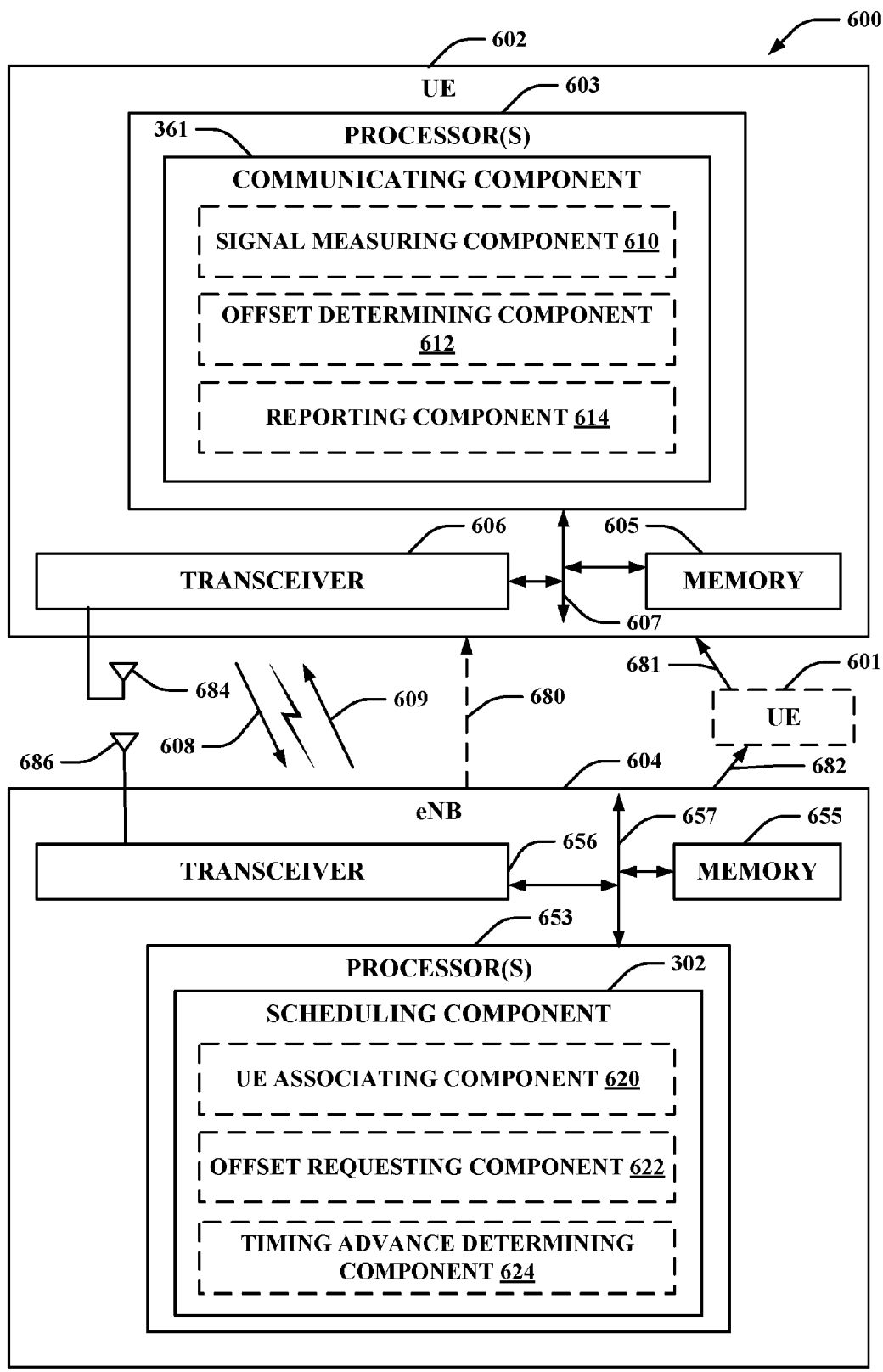
FIG. 6 is a diagram illustrating an example of a system for communicating in a ULL wireless communication technology in accordance with aspects described herein.
Figure 7:
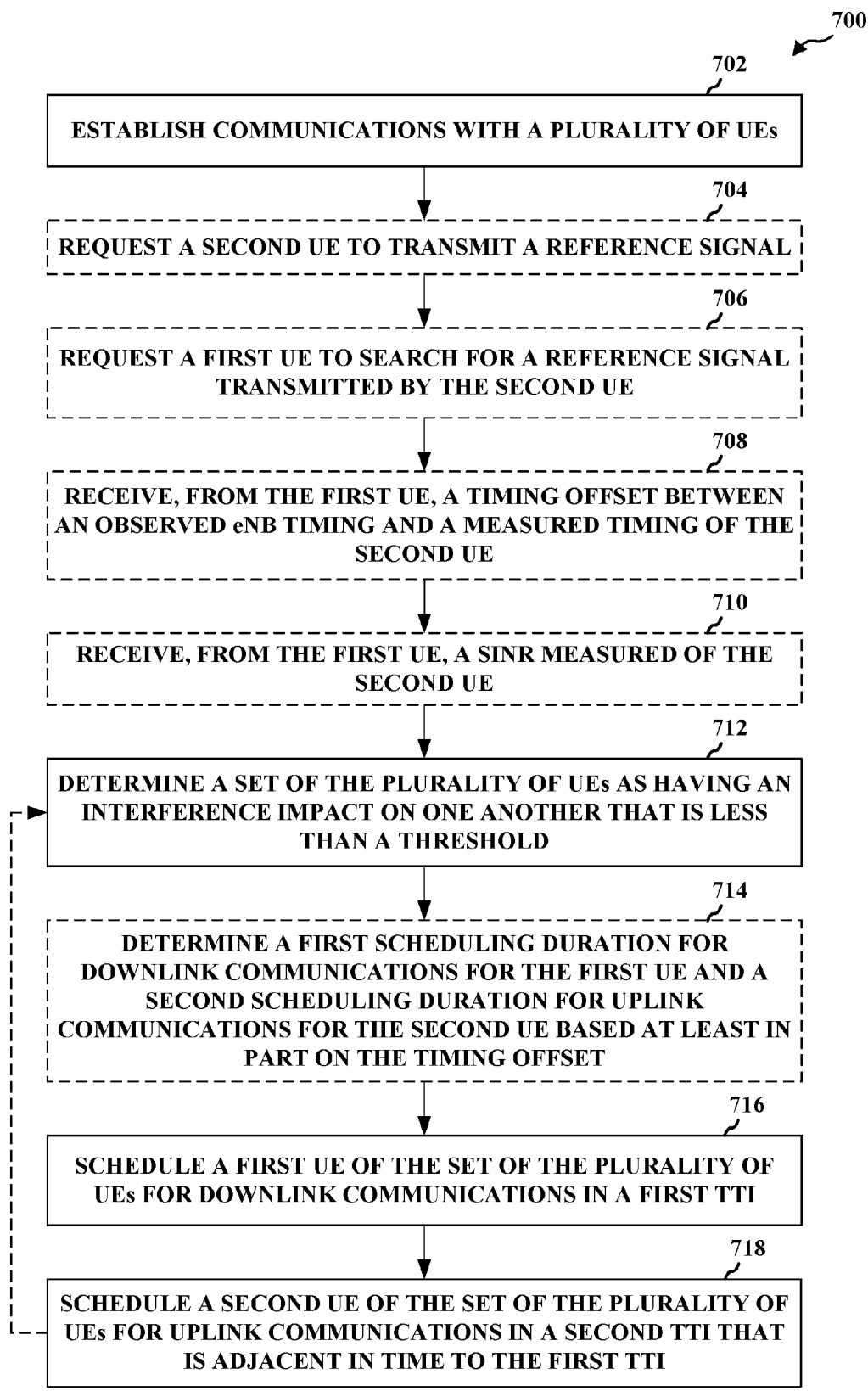
FIG. 7 is a flow chart of an example of a method for scheduling resources in a ULL wireless communication technology in accordance with aspects described herein.
Figure 8:
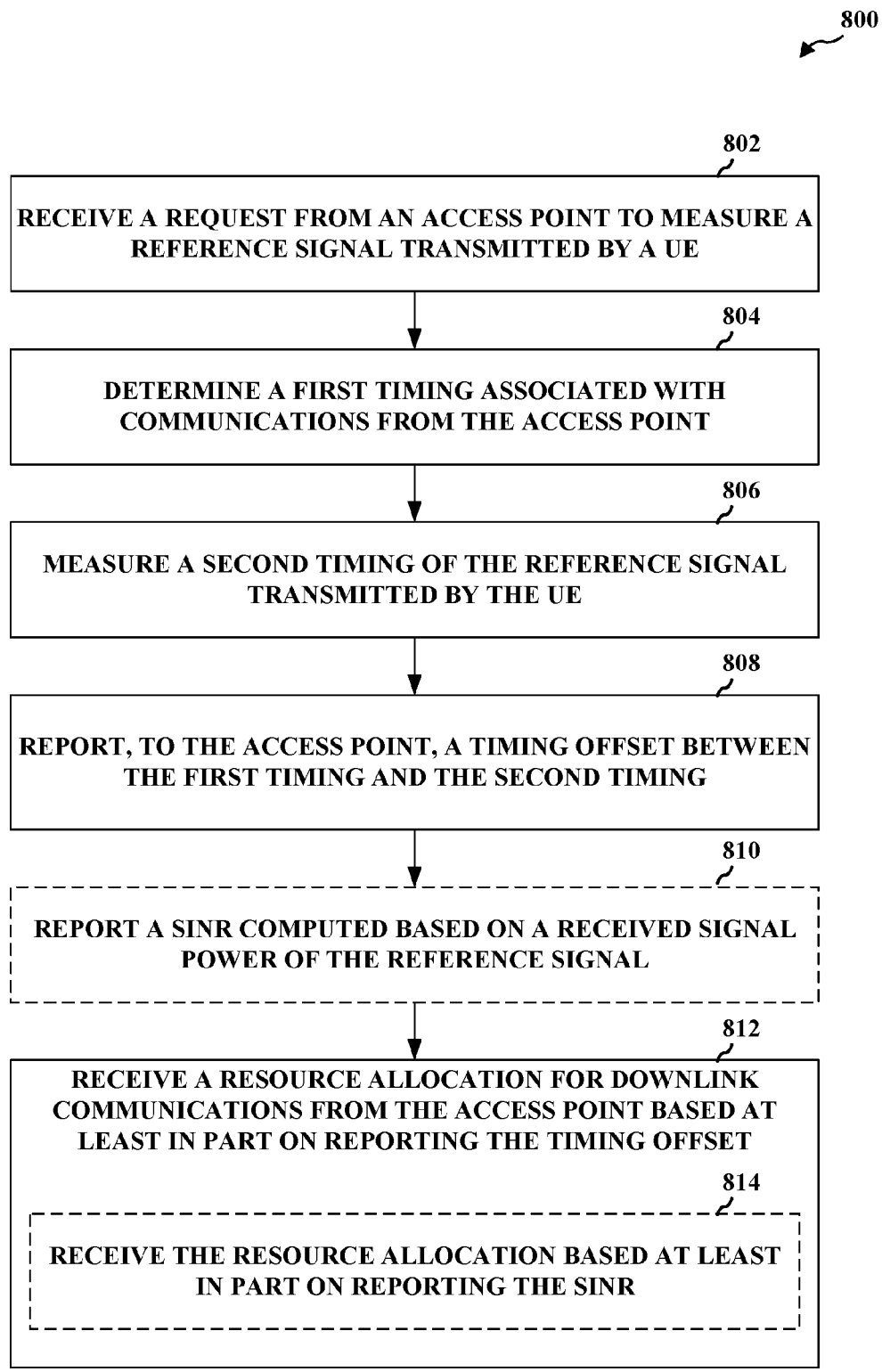
FIG. 8 is a flow chart of an example of a method for receiving a resource allocation in a ULL wireless communication technology in accordance with aspects described herein.
Figure 9:
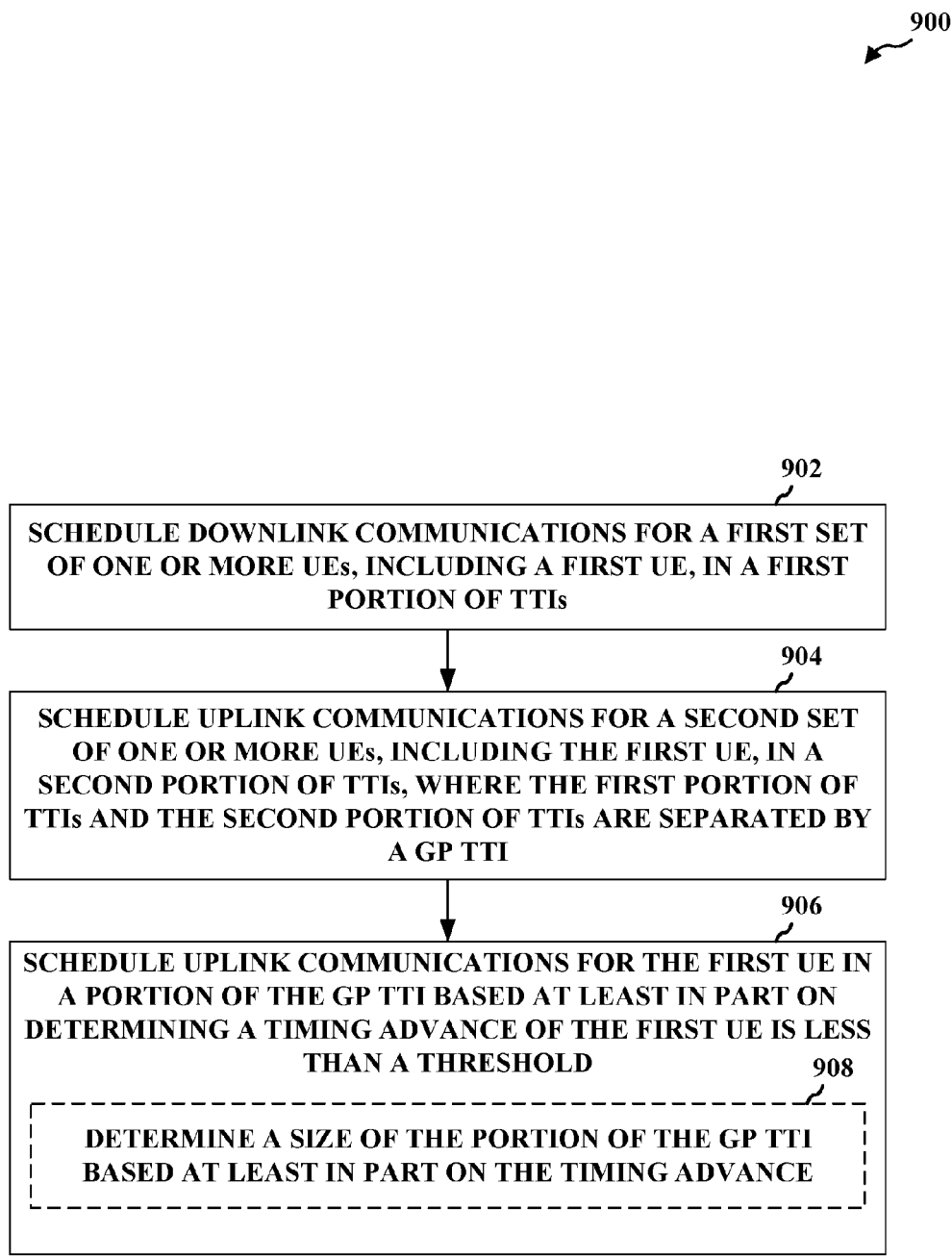
FIG. 9 is a flow chart of an example of a method for scheduling resources in a guard period in a ULL wireless communication technology in accordance with aspects described herein.

Referring to FIGS. 6-9, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 7-9 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 6 illustrates an example of a system 600 for scheduling ULL communications. System 600 includes a UE 602 that communicates with an eNB 604 to access a wireless network, examples of which are described in FIGS. 1-3 (e.g., access points 105, eNB 204, small cell eNB 208, eNB 310, UEs 115, 206, 350, etc.), above. In an aspect, eNB 604 and UE 602 may have established one or more downlink channels over which to communicate via downlink signals 609, which can be transmitted by eNB 604 (e.g., via transceiver 656) and received by UE 602 (e.g., via transceiver 606) for communicating control and/or data messages (e.g., in signaling) from the eNB 604 to the UE 602 over configured communication resources. Moreover, for example, eNB 604 and UE 602 may have established one or more uplink channels over which to communicate via uplink signals 608, which can be transmitted by UE 602 (e.g., via transceiver 606) and received by eNB 604 (e.g., via transceiver 656) for communicating control and/or data messages (e.g., in signaling) from the UE 602 to the eNB 604 over configured communication resources.

As described further herein, for example, eNB 604 may communicate a resource grant 680 that can indicate resources over which the UE 602 is to communicate (e.g., transmit or receive) data with eNB 604, where the resources can correspond to a ULL communication technology, as described. For example, resources related to a ULL communication technology can relate to a ULL timeline (e.g., a timeline having a TTI that is less than a subframe in duration, such as the timelines 400, 402 in FIG. 4), and/or may correspond to a grant in an allocation space (e.g., allocation space 500, 502, etc. in FIG. 5). System 600 may also optionally include another UE 601, which may have similar components as UE 602, though not shown. In one example, as described herein, eNB 604 may pair UEs 601, 602 for scheduling communications based on one or more determinations regarding an interference impact the UEs potentially have upon one another.

In an aspect, UE 602 may include one or more processors 603 and/or a memory 605 that may be communicatively coupled, e.g., via one or more buses 607, and may operate in conjunction with or otherwise implement a communicating component 361 for communicating using a ULL communication technology based on one or more resource grants. For example, the various operations related to communicating component 361 may be implemented or otherwise executed by one or more processors 603 and, in an aspect, can be executed by a single processor, while in other aspects, different ones of the operations may be executed by a combination of two or more different processors. For example, in an aspect, the one or more processors 603 may include any one or any combination of a modem processor, or a baseband processor, or a digital signal processor, or an application specific integrated circuit (ASIC), or a transmit processor, receive processor, or a transceiver processor associated with transceiver 606. Further, for example, the memory 605 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 603. Moreover, memory 605 or computer-readable storage medium may be resident in the one or more processors 603, external to the one or more processors 603, distributed across multiple entities including the one or more processors 603, etc.

In particular, the one or more processors 603 and/or memory 605 may execute actions or operations defined by communicating component 361 or its subcomponents. For instance, the one or more processors 603 and/or memory 605 may execute actions or operations defined by an optional signal measuring component 610 for measuring signals transmitted by other UEs. In an aspect, for example, signal measuring component 610 may include hardware (e.g., one or more processor modules of the one or more processors 603) and/or computer-readable code or instructions stored in memory 605 and executable by at least one of the one or more processors 603 to perform the specially configured signal measuring operations described herein. Further, for instance, the one or more processors 603 and/or memory 605 may execute actions or operations defined by an optional offset determining component 612 for determining a timing offset between the signals transmitted by other UEs in a TTI and a timing of signals received from an eNB 604. In an aspect, for example, offset determining component 612 may include hardware (e.g., one or more processor modules of the one or more processors 603) and/or computer-readable code or instructions stored in memory 605 and executable by at least one of the one or more processors 603 to perform the specially configured offset determining operations described herein. Further, for instance, the one or more processors 603 and/or memory 605 may optionally execute actions or operations defined by an optional reporting component 614 for reporting the timing offset and/or other signal metrics. In an aspect, for example, reporting component 614 may include hardware (e.g., one or more processor modules of the one or more processors 603) and/or computer-readable code or instructions stored in memory 605 and executable by at least one of the one or more processors 603 to perform the specially configured reporting operations described herein.

Similarly, in an aspect, eNB 604 may include one or more processors 653 and/or a memory 655 that may be communicatively coupled, e.g., via one or more buses 657, and may operate in conjunction with or otherwise implement a scheduling component 302 for generating resource grants for one or more UEs for ULL wireless communications. For example, the various functions related to scheduling component 302 may be implemented or otherwise executed by one or more processors 653 and, in an aspect, can be executed by a single processor, while in other aspects, different ones of the functions may be executed by a combination of two or more different processors, as described above. In one example, the one or more processors 653 and/or memory 655 may be configured as described in examples above with respect to the one or more processors 603 and/or memory 605 of UE 602.

In an example, the one or more processors 653 and/or memory 655 may execute actions or operations defined by scheduling component 302 or its subcomponents. For instance, the one or more processors 653 and/or memory 655 may execute actions or operations defined by an optional UE associating component 620 for associating UEs in a set or pair based on determining that the UEs potentially have an interference impact on one another that is less than a threshold. In an aspect, for example, UE associating component 620 may include hardware (e.g., one or more processor modules of the one or more processors 653) and/or computer-readable code or instructions stored in memory 655 and executable by at least one of the one or more processors 653 to perform the specially configured UE associating operations described herein. Further, for instance, the one or more processors 653 and/or memory 655 may execute actions or operations defined by an optional offset requesting component 622 for requesting one or more UEs to report a timing offset related to transmissions by another UE. In an aspect, for example, offset requesting component 622 may include hardware (e.g., one or more processor modules of the one or more processors 653) and/or computer-readable code or instructions stored in memory 655 and executable by at least one of the one or more processors 653 to perform the specially configured offset requesting operations described herein. Further, for instance, the one or more processors 653 and/or memory 655 may execute actions or operations defined by an optional timing advance determining component 624 for determining a timing advance related to one or more UEs. In an aspect, for example, timing advance determining component 624 may include hardware (e.g., one or more processor modules of the one or more processors 653) and/or computer-readable code or instructions stored in memory 655 and executable by at least one of the one or more processors 653 to perform the specially configured timing advance determining operations described herein.

In an example, transceivers 606, 656 may be configured to transmit and receive wireless signals through one or more antennas 684, 686 and may generate or process the signals using one or more RF front end components (e.g., power amplifiers, low noise amplifiers, filters, analog-to-digital converters, digital-to-analog converters, etc.), one or more transmitters, one or more receivers, etc. In an aspect, transceivers 606, 656 may be tuned to operate at specified frequencies such that UE 602 and/or eNB 604 can communicate at a certain frequency. In an aspect, the one or more processors 603 may configure transceiver 606 and/or one or more processors 653 may configure transceiver 656 to operate at a specified frequency and power level based on a configuration, a communication protocol, etc. to communicate uplink signals 608 and/or downlink signals 609, respectively, over related uplink or downlink communication channels.

In an aspect, transceivers 606, 656 can operate in multiple bands (e.g., using a multiband-multimode modem, not shown) such to process digital data sent and received using transceivers 606, 656. In an aspect, transceivers 606, 656 can be multiband and be configured to support multiple frequency bands for a specific communications protocol. In an aspect, transceivers 606, 656 can be configured to support multiple operating networks and communications protocols. Thus, for example, transceivers 606, 656 may enable transmission and/or reception of signals based on a specified modem configuration.

FIG. 7 illustrates an example of a method 700 for scheduling (e.g., by an eNB) UEs for downlink and/or uplink communications in one or more TTIs. At 702, the eNB can establish communications with a plurality of UEs. In an aspect, scheduling component 302, e.g., in conjunction with processor(s) 653, memory 655, and/or transceiver 656, may establish communications with a plurality of UEs (e.g., UE 601, 602). For example, the UEs may initiate a random access or other access procedure with the eNB 604 over a random access channel provided by the eNB 604 to establish communications. In an example, the eNB 604 may assign a radio network temporary identifier (RNTI) to the one or more UEs 601, 602 based on the access procedure, and the UEs 601, 602 can utilize the RNTI to determine or obtain resource grants or other communications from the eNB 604. Regardless of the procedure used to establish the communications, eNB 604 may schedule the UEs to receive downlink communications from, or transmit uplink communications to eNB 604. In an example, eNB 604 can establish ULL communications with the UEs 601, 602 based on a ULL timeline (e.g., using a TTI having a duration of less than 1 subframe), and/or can schedule resources to the UEs 601, 602 based on the ULL timeline.

At 704, the eNB may optionally request a second UE to transmit a reference signal. In an aspect, UE associating component 620, e.g., in conjunction with processor(s) 653, memory 655, and/or transceiver 656, may request the second UE (e.g., UE 601) to transmit a reference signal. For example, offset requesting component 622 may send a request, such as request 682, to UE 601, which may include a request sent over a control channel with UE 601. The request may relate to a request that the second UE transmit a DM-RS or other signal that can be received and measured by other UEs. In addition, for example, offset requesting component 622 may specify a TTI (e.g., a symbol or other TTI) during which the DM-RS is to be transmitted. Moreover, for example, offset requesting component 622 can indicate a TTI in the request for transmitting the signal, where the indicated TTI may be in an uplink portion in a TDD configuration (e.g., a TTI in one or more periods of time 524, which may include period of time 526 or otherwise). The UE (e.g., UE 601) may receive the request and accordingly transmit the signal, or may transmit the signal autonomously or based on a different request/configuration from the eNB 604 or other eNBs or components of a corresponding network.

At 706, the eNB may optionally request a first UE to search for a reference signal transmitted by the second UE. In an aspect, offset requesting component 622, e.g., in conjunction with processor(s) 653, memory 655, and/or transceiver 656, may request the first UE (e.g., UE 602) to search for a reference signal transmitted by the second UE (e.g., UE 601). For example, offset requesting component 622 may send a request to UE 602, which may include a request sent over a control channel with UE 602. For example, offset requesting component 622 may indicate, to UE 602, the TTI over which the UE 601 is to transmit the reference signal (e.g., DM-RS). Offset requesting component 622 may also indicate an identifier, frequency resources, etc. related to the reference signal to ensure the UE 602 measures the signal transmitted by UE 601, in an example. As described further herein, this can enable the UE 602 to measure a timing offset between a timing associated with the signal transmitted by the UE 601 and a timing associated with signals received by the UE 602 from eNB 604.

At 708, the eNB may optionally receive, from the first UE, a timing offset between an observed eNB timing and a measured timing of the second UE. In an aspect, offset requesting component 622, e.g., in conjunction with processor(s) 653, memory 655, and/or transceiver 656, may receive, from the first UE (e.g., UE 602), a timing offset between the observed eNB timing (e.g., a timing of eNB 604 as measured and/or otherwise observed by the UE) and a measured timing of the second UE (e.g., UE 601). For example, offset requesting component 622 may receive the timing offset based on the request at Block 706 to search for the reference signal and/or the request at Block 704 to request UE 601 to transmit the signal. In another example, as described further herein however, offset requesting component 622 may receive the timing offset without one or more of the requests (e.g., UE 602 may measure DM-RS of various UEs and/or UE 601, may identify the DM-RS, and may report the timing offset to the eNB 604). In an example, offset requesting component 622 can request multiple UEs to search for the reference signal transmitted by the second UE, and accordingly report timing offsets for determining UEs to associate in sets or pairs for resource allocation, as described further below.

At 710, the eNB may optionally receive, from the first UE, a SINR measured of the second UE. In an aspect, offset requesting component 622, e.g., in conjunction with processor(s) 653, memory 655, and/or transceiver 656, may receive, from the first UE (e.g., UE 602), the SINR measured of the second UE (e.g., the SINR of the signal transmitted by UE 601 as measured by UE 602). Similarly, for example, offset requesting component 622 may receive the SINR based on the request at Block 706 to search for the reference signal and/or the request at Block 704 to request UE 601 to transmit the signal. In another example, as described further herein however, offset requesting component 622 may receive the SINR without one or more of the requests (e.g., UE 602 may measure a RSSI, RSRP, RSRQ, and/or the like, and determine a SINR based on the DM-RS of various UEs and/or UE 601, and may report one or more SINRs associated with the one or more DM-RSs to the eNB 604). In an example, offset requesting component 622 can request multiple UEs to search for the reference signal transmitted by the second UE, and accordingly report SINRs for determining UEs to associate in sets or pairs for resource allocation, as described further below. Moreover, for example, offset requesting component 622 may receive the SINR in a modified channel state information (CSI) message that includes interference contribution by the reference signal transmitted by the second UE (e.g., UE 601).

Thus, peer-to-peer channel sounding can be employed in one aspect such that UE 602 can measure channel sounding (e.g., reference signal transmission) by UE 601. In this example, UE 602 can report the timing offset, as described further herein, to facilitate determining whether the UEs potentially cause interference that is less than or achieves a threshold level of interference.

At 712, the eNB may determine a set of the plurality of UEs as having an interference impact on one another that is less than a threshold. In an aspect, UE associating component 620, e.g., in conjunction with processor(s) 653 and/or memory 655, may determine the set of the plurality of UEs as having an interference impact on one another that is less than a threshold. For example, where the timing offset is received from the first UE at Block 708, UE associating component 620 can determine at least the first UE and the second UE as being a pair or in a set of UEs having interference impact on one another that is less than a threshold. In an example, UE associating component 620 can determine this based on comparing the timing offset to a threshold, and if the timing offset achieves a threshold, UE associating component 620 can associate the first UE (e.g., UE 602) and second UE (e.g., UE 601) for scheduling communications thereto in adjacent TTIs. In one example, a larger timing offset between the UEs can correspond to a smaller region of interference in a given TTI, thus where the timing offset achieves the threshold, this may indicate the UEs have low interference impact with respect to one another.

In another example, where the SINR is received at 710, UE associating component 620 can additionally or alternatively utilize the SINR measured by UE 602 when UE 601 transmits the signal to determine whether to associate the UEs. For example, if the SINR achieves a threshold, the UEs can be associated in a pair or set for scheduling of communications in adjacent TTIs. In either example, the GP can be removed or otherwise not utilized in allocating downlink and uplink resources by the eNB 604, as downlink communications to the UE 602 can be determined to have a small (less than a threshold) interference impact on uplink communications from the UE 601, where the interference impact is either a function of the timing offset (e.g., a period of time over which interference occurs) and/or a SINR (e.g., a level of interference). Thus, for example, UEs that do not interfere with one another at a certain level and/or do so for less than a period of time may be associated for assigning downlink communications to one UE and uplink communications to another UE in adjacent TTIs, as benefits typically associated with having a GP may not be relevant for such UEs.

At 714, the eNB may optionally determine a first scheduling duration for downlink communications for the first UE and a second scheduling duration for uplink communications for the second UE based at least in part on the timing offset. In an aspect, scheduling component 302, e.g., in conjunction with processor(s) 653 and/or memory 655, may determine the first scheduling duration for downlink communications for the first UE (e.g., UE 602) and the second scheduling duration for uplink communications for the second UE (e.g., UE 601) based at least in part on the timing offset. For example, the timing offset can indicate when a period of interference occurs between the UEs, and thus scheduling component 302 can determine the durations for scheduling communications such that the downlink communications in TTIs before those for the first UE are not impacted by interference from the second UE and/or that the uplink communications in TTIs after those for the second UE are not impacted by downlink communications to the first UE. Thus, in this example, the known interference can be limited to the determined associated UEs 601, 602 in this regard.

At 716, the eNB can accordingly schedule a first UE of the set of the plurality of UEs for downlink communications in a first TTI, and at 718, can schedule a second UE of the set of the plurality of UEs for uplink communications in a second TTI that is adjacent in time to the first TTI. In an aspect, scheduling component 302, e.g., in conjunction with processor(s) 653, memory 655, and/or transceiver 656, may schedule the first UE (e.g., UE 602) of the set of the plurality of UEs for downlink communications in a first TTI, and schedule a second UE (e.g., UE 601) of the set of the plurality of UEs for uplink communications in a second TTI that is adjacent in time to the first TTI. As used herein, the term scheduling may be defined to include internal processing within the eNB and/or transmission of scheduling information associated with the internal scheduling/processing.

Figure 10:
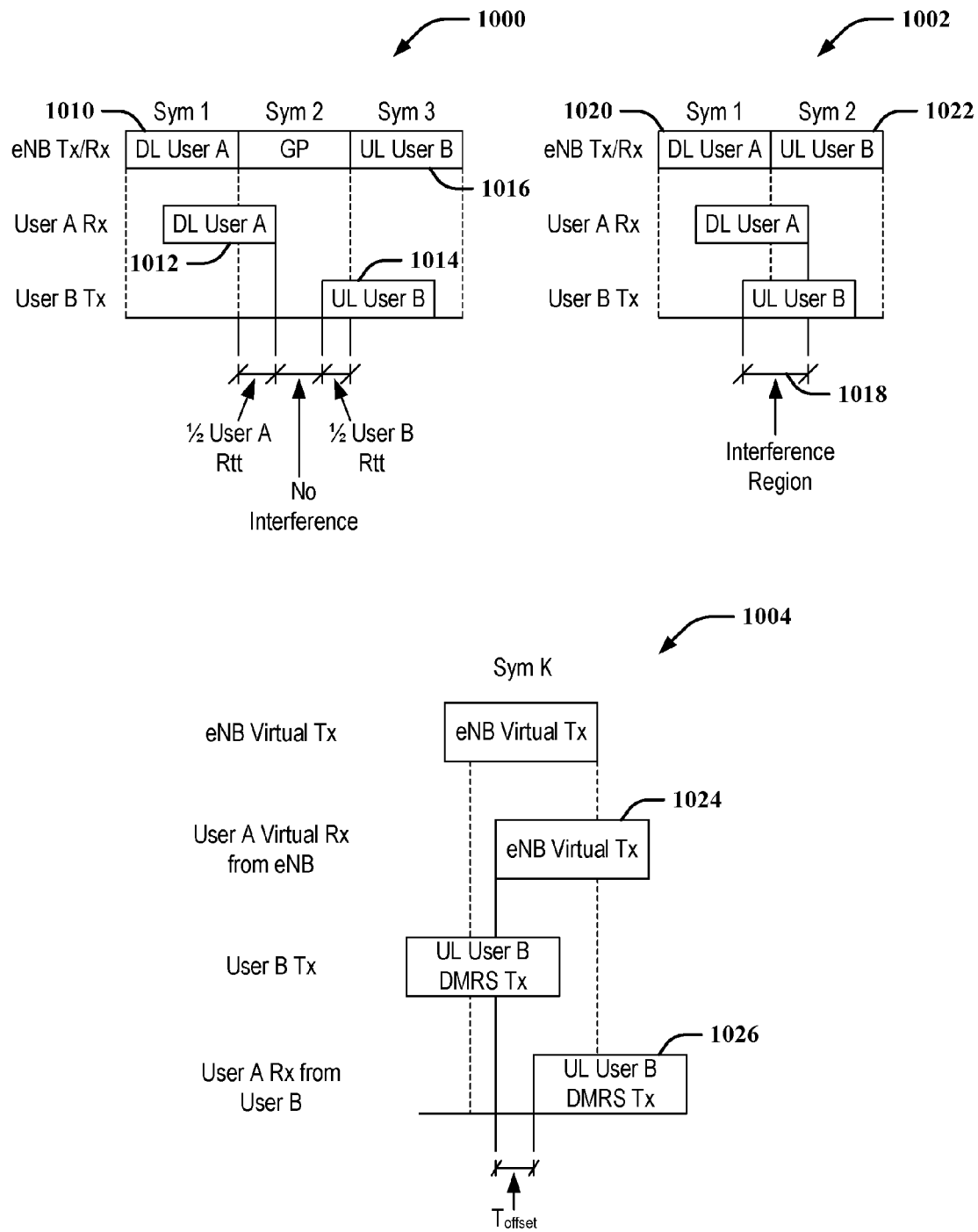
FIG. 10 is a diagram of an example of a timeline for allocating resources in ULL communications in accordance with aspects described herein.

Examples of scheduling are shown in FIG. 10. For example, a timeline 1000 is shown for scheduling a downlink (DL) user A (e.g., UE 602) with downlink communication resources and an uplink (UL) user B (e.g., UE 601) with uplink communication resources. In this example, UE associating component 620 may associate the DL user A and UL user B based on a timing offset determined as described above and further herein. For example, the timing offset may indicate that there is no interference, or interference below a threshold level, between DL user A and UL user B in a GP when considering the timing offset of the DL user A. For example, eNB can transmit a communication 1010 to DL user A in a first TTI, and DL user A can receive the transmission 1012 at a time corresponding to around one half of a round trip time (RTT) corresponding to communications between the eNB and user A. UL user B can transmit a communication 1014 to the eNB in a second TTI, and the eNB can receive the communication 1016 at a time corresponding to around one half of a RTT corresponding to communications between the eNB and user B. The timing offset can correspond to a difference between the one half RTTs of the related communications (e.g., when DL user A receives DL communications from the eNB 604 when sent during a first TTI) and the offset of the UL user B as observed by DL user A (e.g., when DL user A receives signals transmitted by UL user B sent in another TTI).

In timeline 1002, the GP TTI can be removed, and thus there is an interference region 1018 where communications from UL user B may interfere with communications to DL user A. If this interference region 1018 is determined to be smaller than a threshold (e.g., the offset between the UEs achieves a threshold) and/or of less than a threshold SINR, the GP may be removed and the UEs may be scheduled in adjacent TTIs. As shown, for example, user A can be scheduled for a downlink communication 1020 in one TTI, and user B can be scheduled to transmit an uplink communication 1022 in an adjacent TTI.

Timeline 1004 shows another example of how the timing offset may be determined, as described below, based on an offset of when user A receives downlink communications 1024 from the eNB 604 and when user A receives interference from a signal 1026 (e.g., DM-RS) from user B in uplink communications to the eNB 604 with respect to a TTI. In an example, user A can report these times to the eNB, and eNB (e.g., via UE associating component 620) can determine the timing offset for determining whether to associate the UEs in a pair or set for scheduling downlink and uplink resources in adjacent TTIs.

In addition, multiple UEs determined to be associated in a pair or set may be scheduled for downlink/uplink communications in this regard over different portions of frequency in an FDM system without using a GP (or accordingly adapting a size of the GP). Moreover, after associating the sets or pairs of UEs, UE associating component 620 may periodically perform the association to account for temporal changes in relative position (or location) and/or timing of the UEs 601, 602 (and/or eNB 604), or may aperiodically perform the association based on one or more detected parameters. For example, the one or more detected parameters may correspond to detecting a change in timing advance of a UE (e.g., UE 601 and/or 602), a detected change in GPS positioning of a UE (e.g., UE 601 and/or 602), a detected consistency (or inconsistency) of modulation receiver performance of a UE (e.g., UE 602) in the presence of an associated UE (e.g., UE 601), a comparison of CSI feedback from a UE (e.g., UE 602) when an associated UE's transmissions are present or not present (e.g., UE 601). In any case, for example, after scheduling the second UE at 718, the UE (e.g., via UE associating component 620) can again optionally determine the set of the plurality of UEs at 712. In one example, UE associating component 620 may perform the association again based on performing at least one or more of Blocks 704, 706, 708, 710, 712 of method 700, as described above.

FIG. 8 illustrates an example of a method 800 for receiving (e.g., by a UE) resource allocation for downlink and/or uplink communications in one or more TTIs. At 802, the UE can receive a request from an access point to measure a reference signal transmitted by a UE. In an aspect, signal measuring component 610, e.g., in conjunction with processor(s) 603, memory 605, and/or transceiver 606, may receive the request from the access point (e.g., eNB 604) to measure a reference signal transmitted by a UE (e.g., by UE 601). For example, as described, signal measuring component 610 may receive the request over a control channel established between the UE 602 and eNB 604. In an example, the request may indicate one or more parameters regarding the reference signal to be measured, such as a TTI (or related duration) over which the reference signal is transmitted by the other UE 601, a bandwidth or related channel over which the reference signal is transmitted, an identifier indicated in the reference signal, etc. For example, the reference signal may be a DM-RS.

At 804, the UE can determine a first timing associated with communications from the access point. In an aspect, offset determining component 612, e.g., in conjunction with processor(s) 603, memory 605, and/or transceiver 606, may determine the first timing associated with communications from the access point (e.g., from eNB 604, which may be based one or more signals received from eNB 604). For example, the timing can relate to a difference between a timing of a TTI and a timing at which the signals transmitted in the TTI by the eNB 604 are received at the UE 602 (e.g., a one half RTT).

At 806, the UE can measure a second timing of the reference signal transmitted by the other UE. In an aspect, offset determining component 612, e.g., in conjunction with processor(s) 603, memory 605, and/or transceiver 606, may measure the second timing of the reference signal transmitted by the other UE (e.g., UE 601). For example, offset determining component 612 can measure the second timing as a difference of the TTI over which the reference signal was transmitted by the UE 601 and when the signal was received at the UE 602 (e.g., a one half RTT). In one example, an indication of the TTI (and/or related TTI duration) over which the UE 601 transmits the reference signal may be indicated in the request from the access point received at 702.

At 808, the UE may report, to the access point, a timing offset between the first timing and the second timing. In an aspect, reporting component 614, e.g., in conjunction with processor(s) 603, memory 605, and/or transceiver 606, may report, to the access point (e.g., eNB 604), the timing offset between the first timing and the second timing. As described, for example, the timing offset can be indicative of an interference impact between the UEs (e.g., UE 601, 602) if communications are scheduled near in time to one another. For instance, a large timing offset (e.g., a timing offset that achieves a threshold) may indicate a low interference impact, as a region of interference between the UEs may be less than a threshold and/or may not exist. Thus, the eNB 604 may (or may not) associate the UEs in a pair or set depending on the timing difference, where the set or pairing is used to determine whether the UEs can be scheduled for communications in adjacent TTIs, as described above. The timing offset may be positive or negative depending on a relative position of the UEs 601, 602 and eNB 604, and the timing offset may exceed a symbol or other TTI duration.

At 810, the UE may optionally also report a SINR computed based on a received signal power of the reference signal. In an aspect, reporting component 614, e.g., in conjunction with processor(s) 603, memory 605, and/or transceiver 606, may report, to the access point (e.g., eNB 604), a SINR computed based on a received signal power (e.g., RSSI, RSRP, RSRQ, etc.) of the reference signal. For example, reporting component 614 may determine the SINR based on the reference signal (e.g., based on considering the reference signal as interference to signals received from eNB 604 or other sources). For example, reporting component 614 may report the SINR in a modified CSI message that includes interference contribution by the second UE (e.g., UE 601) reference signal to signals received from eNB 604. For example, the modified CSI message may be based on a CSI message defined in LTE but modified to include a parameter corresponding to the interference contribution. In an example, where the SINR achieves a threshold, this may indicate the interference caused by the UE 601 is low and not prohibitive for scheduling communications for the UEs 601, 602 that may interfere, and the eNB may pair the UEs 601, 602, or otherwise associate the UEs 601, 602 in a set, as described.

At 812, the UE may receive a resource allocation for downlink communications from the access point based at least in part on reporting the timing offset. In an aspect, communicating component 361, e.g., in conjunction with processor(s) 603, memory 605, and/or transceiver 606, may receive the resource allocation for downlink communications from the access point (e.g., from eNB 604) based at least in part on reporting the timing offset. For example, the resource allocation may schedule resources for receiving downlink communications at UE 602, and the resources may be adjacent to resources allocation to UE 601 for transmitting uplink communications, where eNB 604 determines to associate the UEs 601, 602, as described. In addition, there may not be a GP TTI between the TTIs over which downlink communication resources are scheduled for UE 602 and the uplink communication resources are scheduled for UE 601. Additionally, at 814, the UE, e.g., via communicating component 361, may optionally receive the resource allocation based at least in part on reporting the SINR. As described, for example, the eNB 604 may determine that the UEs may not cause significant interference to one another where the SINR is less than a threshold.

FIG. 9 illustrates another example of a method 900 for scheduling (e.g., by an eNB) UEs for downlink and/or uplink communications in one or more TTIs. At 902, the eNB can schedule downlink communications for a first set of one or more UEs, including a first UE, in a first portion of TTIs. In an aspect, scheduling component 302, e.g., in conjunction with processor(s) 653, memory 655, and/or transceiver 656, may schedule downlink communications for a first set of one or more UEs, including a first UE (e.g., UE 602) in a first portion of TTIs. In an example, the first portion of TTIs can correspond to one or more TTIs (e.g., symbols in a subframe) before a GP TTI after which the eNB switches to scheduling uplink communications. For example, referring to FIG. 5, the eNB 604 can schedule the first set of UEs for downlink communications in the DL control and/or DL data TTIs (e.g., symbols) before GP period of time 522.

At 904, the eNB can schedule uplink communications for a second set of the one or more UEs, including the first UE, in a second portion of TTIs, where the first portion of TTIs and the second portion of TTIs are separated by a GP TTI. In an aspect, scheduling component 302, e.g., in conjunction with processor(s) 653, memory 655, and/or transceiver 656, may schedule uplink communications for the second set of the one or more UEs, including the first UE, in the second portion of TTIs, where the first portion of TTIs and the second portion of TTIs are separated by a GP TTI. Again, referring to FIG. 5, for example, the eNB 604 can schedule the second set of UEs for uplink communications in the periods of time 524 (e.g., symbols) after GP period of time 522.

At 906, the eNB may additionally schedule uplink communications for the first UE in a portion of the GP TTI based at least in part on determining a timing advance of the first UE is less than a threshold. In an aspect, scheduling component 302, e.g., in conjunction with processor(s) 653, memory 655, and/or transceiver 656, may additionally schedule uplink communications for the first UE in a portion of the GP TTI based at least in part on determining the timing advance of the first UE is less than a threshold. The portion of the GP TTI may include an ending portion of the GP TTI such that communications for the first UE are scheduled in the ending portion of the GP TTI and at least a portion of an adjacent TTI, as described further herein and depicted in FIG. 11.

In addition, the eNB may optionally, at 908, determine a size of the portion of the GP TTI based at least in part on the timing advance. In an aspect, scheduling component 302, e.g., in conjunction with processor(s) 653, memory 655, and/or transceiver 656, may determine the size of the portion of the GP TTI based at least in part on the timing advance. For example, where a given UE (e.g., UE 602) is within a threshold distance of eNB 604 (e.g. ~5 km or less), it may be able to utilize a portion of a GP TTI (e.g., ~½ symbol GP) with no interference between uplink and downlink transmission. Thus, eNB 604 may determine one or more UEs suitable for partial symbol GPs (e.g., based on the timing advance), and can accordingly shorten the GP within the GP TTI to allow allocating some resources in the GP TTI to the one or more UEs (e.g., resources occurring later in time in the GP TTI).

In an example, where one half of the GP TTI is allocated as resources for UE communications, one half symbol data can assume same sampling rate $1/T_s$ with half-length symbol ($1024T_s$) and same CP length. In this example, in LTE, the effective GP=$1024T_s$–CP, and frequency tones can be aligned with regular symbols by at least twice the bandwidth spacing (e.g., 30 kilohertz (kHz) instead of 15 kHz). For example, $T_s$ in LTE (and/or ULL LTE) can correspond to $1/(15000*2048)$ seconds or $1/T_s$=30.72 MHz, which can be the fundamental sampling rate used in LTE. In an example, scheduling component 302 can utilize other portions besides one half of the GP TTI. Additionally, as described, scheduling component 302 can determine the other portions based on the timing advance (e.g., ranges on timing advance can be associated with different portions that can be utilized for the GP TTI). Moreover, for example, scheduling component 302 may select a UE with the smallest timing advance as the UE for which uplink resources are scheduled in the GP TTI (e.g., and for which downlink resources are scheduled in at least one TTI adjacent to and occurring before the GP TTI).

Figure 11:
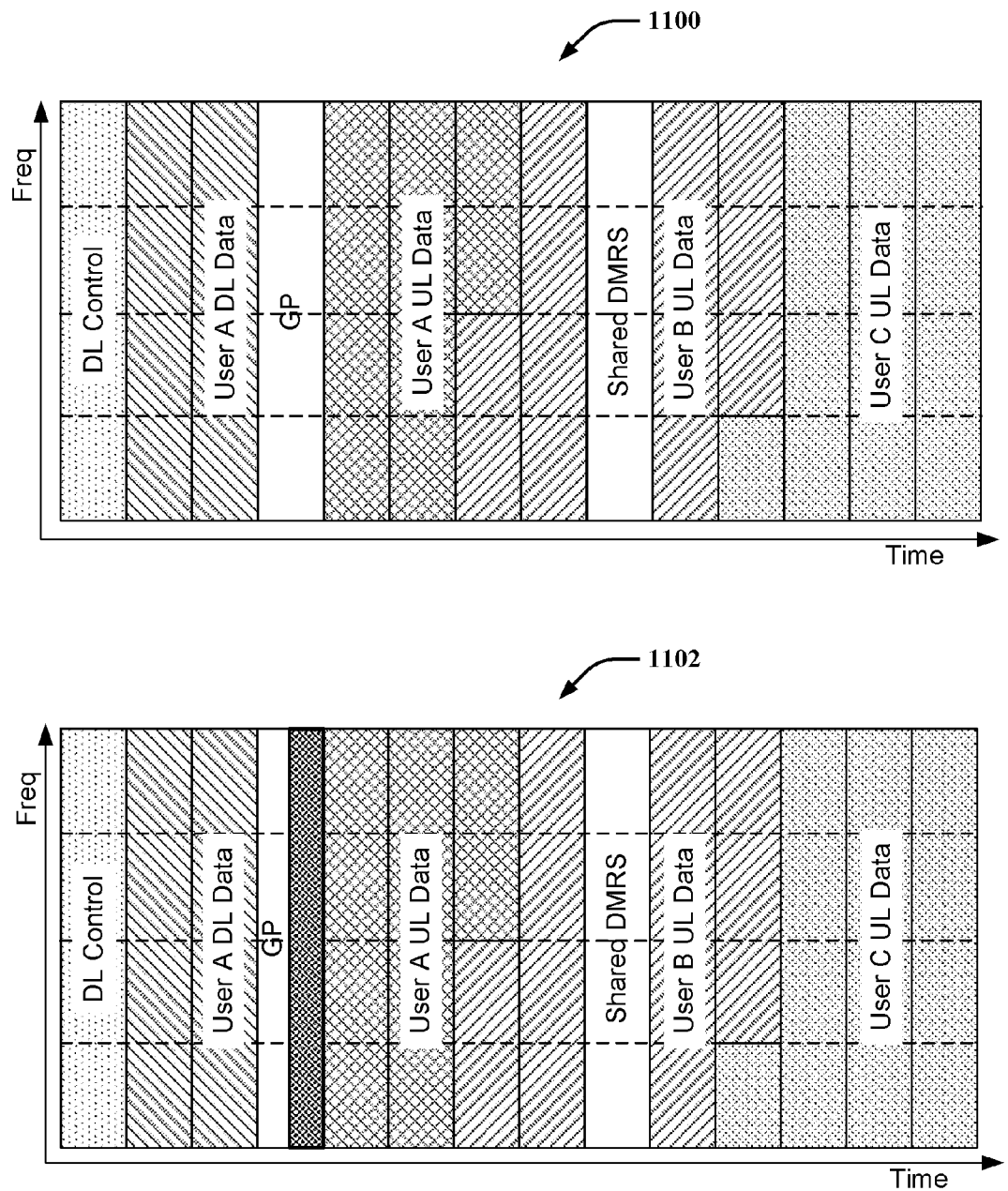
FIG. 11 is a diagram of an example of an allocation space for allocating resources in ULL communications in accordance with aspects described herein.

An example of scheduling is shown in FIG. 11, which shows an allocation space 1100 similar to allocation space 502 in FIG. 5, and an allocation space 1102 with a shortened GP TTI, as described above. In this example, scheduling component 302 schedules downlink communications to user A (e.g., UE 602) in the TTI occurring before, and adjacent to, the GP TTI in time, and schedules uplink communications to the same user A in the latter portion of the GP TTI. Scheduling resources in this regard, for example, can ensure that there is no interference from downlink communications after the first portion of the GP TTI to uplink communications scheduled in the latter portion of the GP TTI (e.g., based on determining user A has an associated timing advance determined to allow for this scheduling). Scheduling component 302, in this example, also schedules user A uplink communications in the next one or more TTIs.

In an aspect, a method for scheduling resources for communicating with one or more UEs in wireless communications includes scheduling downlink communications for a first set of one or more UEs, including a first UE, in a first portion of TTI, scheduling uplink communications for a second set of one or more UEs, including the first UE, in a second portion of TTIs, wherein the first portion of TTIs and the second portion of TTIs are separated by a guard period TTI, and scheduling uplink communications for the first UE in a portion of the guard period TTI based at least in part on determining a timing advance of the first UE is less than a threshold.

The method also includes wherein scheduling the downlink communications comprises scheduling the downlink communications for the first UE in at least a last TTI of the first portion of TTIs, and wherein scheduling the uplink communications comprises scheduling the uplink communications for the first UE in at least a first TTI of the second portion of TTIs. The method also includes wherein the portion of the guard period TTI is one half of the TTI, and scheduling the uplink communications for the first UE in the portion of the guard period TTI comprises scheduling the uplink communications for the first UE in a last half of the guard period TTI. The method also includes wherein the TTI is of a duration that is less than a subframe. The method also includes wherein the duration is a symbol, two-symbol, or slot duration.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for scheduling resources in wireless communications, comprising:
    establishing, by a base station, communications with a plurality of user equipment (UE);
    requesting a first UE of the plurality of UEs to search for a reference signal transmitted by a second UE in a symbol;
    receiving, from the first UE and based at least in part on requesting the first UE to search for the reference signal, a timing offset between an evolved Node B (eNB) timing and a timing of the second UE;
    determining, by the base station, a set of the plurality of UEs as having an interference impact on one another, for transmitting uplink communications to the base station, that is less than a threshold, wherein determining the set of the plurality of UEs comprises determining the first UE and the second UE in the set of the plurality of UEs based at least in part on the timing offset;
    scheduling, by the base station and based on the determining the set of the plurality of UEs as having the interference impact on one another, the first UE of the set of the plurality of UEs for receiving, in a first transmission time interval (TTI), downlink communications from the base station; and
    scheduling, by the base station and based on the determining the set of the plurality of UEs as having the interference impact on one another, the second UE of the set of the plurality of UEs for transmitting, in a second TTI that is adjacent in time to the first TTI, uplink communications to the base station.

2. The method of claim 1, further comprising requesting the second UE to transmit the reference signal over the symbol.

3. The method of claim 2, wherein requesting at least one of the second UE to transmit the reference signal over the symbol or the first UE to search for the reference signal transmitted by the second UE in the symbol is based at least in part on detecting a change in one or more communication parameters related to the first UE or the second UE.

4. The method of claim 3, wherein the one or more communication parameters includes at least one of a timing advance of the first UE or the second UE, a change in location of the first UE or the second UE, a determined consistency of demodulation performance of the first UE, or a comparison in channel state information feedback from the first UE when the second UE is present and not present.

5. The method of claim 1, wherein the reference signal is a demodulation reference signal (DM-RS).

6. The method of claim 1, further comprising receiving, from the first UE, a signal-to-interference-and-noise ratio (SINR) from the second UE, wherein determining the set of the plurality of UEs comprises determining the first UE and the second UE in the set of the plurality of UEs based at least in part on the SINR.

7. The method of claim 6, wherein receiving the SINR includes receiving the SINR in a modified channel state information (CSI) message.

8. The method of claim 1, further comprising determining a first scheduling duration for the downlink communications for the first UE and a second scheduling duration for the uplink communications for the second UE based at least in part on the timing offset.

9. The method of claim 1, wherein the first TTI and the second TTI are of a duration that is less than a subframe.

10. The method of claim 9, wherein the duration is a symbol, two-symbol, or slot duration.

11. An apparatus for scheduling resources in wireless communications, comprising:
    a transceiver for communicating one or more wireless signals via one or more antennas;
    a memory configured to store instructions; and
    one or more processors communicatively coupled with the transceiver and the memory, wherein the one or more processors are configured to:
        establish communications with a plurality of user equipment (UE);
        request a first UE of the plurality of UEs to search for a reference signal transmitted by a second UE in a symbol;
        receive, from the first UE and based at least in part on requesting the first UE to search for the reference signal, a timing offset between an evolved Node B (eNB) timing and a timing of the second UE;
        determine a set of the plurality of UEs as having an interference impact on one another, for transmitting uplink communications to the apparatus, that is less than a threshold, wherein the one or more processors are configured to determine the first UE and the second UE in the set of the plurality of UEs based at least in part on the timing offset;
        schedule, based on the one or more processors having determined the set of the plurality of UEs as having the interference impact on one another, the first UE of the set of the plurality of UEs for receiving, in a first transmission time interval (TTI), downlink communications from the apparatus; and schedule, based on the one or more processors having determined the set of the plurality of UEs as having the interference impact on one another, the second UE of the set of the plurality of UEs for transmitting, in a second TTI that is adjacent in time to the first TTI, uplink communications to the apparatus.

12. The apparatus of claim 11, wherein the one or more processors are further configured to request the second UE to transmit the reference signal over the symbol.

13. The apparatus of claim 12, wherein the one or more processors are configured to request at least one of the second UE to transmit the reference signal over the symbol or the first UE to search for the reference signal transmitted by the second UE in the symbol based at least in part on detecting a change in one or more communication parameters related to the first UE or the second UE.

14. The apparatus of claim 13, wherein the one or more communication parameters includes at least one of a timing advance of the first UE or the second UE, a change in location of the first UE or the second UE, a determined consistency of demodulation performance of the first UE, or a comparison in channel state information feedback from the first UE when the second UE is present and not present.

15. The apparatus of claim 11, wherein the reference signal is a demodulation reference signal (DM-RS).

16. The apparatus of claim 11, wherein the one or more processors are further configured to receive, from the first UE, a signal-to-interference-and-noise ratio (SINR) from the second UE, wherein the one or more processors are configured to determine the set of the plurality of UEs at least in part by determining the first UE and the second UE in the set of the plurality of UEs based at least in part on the SINR.

17. The apparatus of claim 16, wherein the one or more processors are configured to receive the SINR at least in part by receiving the SINR in a modified channel state information (CSI) message.

18. The apparatus of claim 11, wherein the one or more processors are further configured to determine a first scheduling duration for the downlink communications for the first UE and a second scheduling duration for the uplink communications for the second UE based at least in part on the timing offset.

19. The apparatus of claim 11, wherein the first TTI and the second TTI are of a duration that is less than a subframe.

20. The apparatus of claim 19, wherein the duration is a symbol, two-symbol, or slot duration.

21. An apparatus for scheduling resources in wireless communications, comprising:
means for establishing communications with a plurality of user equipment (UE);
means for requesting a first UE of the plurality of UEs to search for a reference signal transmitted by a second UE in a symbol;
means for receiving, from the first UE and based at least in part on requesting the first UE to search for the reference signal, a timing offset between an evolved Node B (eNB) timing and a timing of the second UE;
means for determining a set of the plurality of UEs as having an interference impact on one another, for transmitting uplink communications to the apparatus, that is less than a threshold, wherein the means for determining determines the first UE and the second UE in the set of the plurality of UEs based at least in part on the timing offset;
means for scheduling, based on the means for determining having determined the set of the plurality of UEs as having the interference impact on one another, the first UE of the set of the plurality of UEs for receiving, in a first transmission time interval (TTI), downlink communications from the apparatus; and
means for scheduling, based on the means for determining having determined the set of the plurality of UEs as having the interference impact on one another, the second UE of the set of the plurality of UEs for transmitting, in a second TTI that is adjacent in time to the first TTI, uplink communications to the apparatus.

22. The apparatus of claim 21, further comprising means for determining a first scheduling duration for the downlink communications for the first UE and a second scheduling duration for the uplink communications for the second UE based at least in part on the timing offset.

23. The apparatus of claim 21, further comprising means for requesting the second UE to transmit the reference signal over the symbol.

24. The apparatus of claim 23, wherein the means for requesting the second UE to transmit the reference signal over the symbol or means for requesting the first UE to search for the reference signal transmitted by the second UE in the symbol requests based at least in part on detecting a change in one or more communication parameters related to the first UE or the second UE.

25. The apparatus of claim 24, wherein the one or more communication parameters includes at least one of a timing advance of the first UE or the second UE, a change in location of the first UE or the second UE, a determined consistency of demodulation performance of the first UE, or a comparison in channel state information feedback from the first UE when the second UE is present and not present.

26. A non-transitory computer-readable medium, comprising code executable by one or more processors for scheduling resources in wireless communications, the code comprising:
code for establishing, by a base station, communications with a plurality of user equipment (UE);
code for requesting a first UE of the plurality of UEs to search for a reference signal transmitted by a second UE in a symbol;
code for receiving, from the first UE and based at least in part on requesting the first UE to search for the reference signal, a timing offset between an evolved Node B (eNB) timing and a timing of the second UE;
code for determining, by the base station, a set of the plurality of UEs as having an interference impact on one another, for transmitting uplink communications to the base station, that is less than a threshold, wherein the code for determining determines the first UE and the second UE in the set of the plurality of UEs based at least in part on the timing offset;
code for scheduling, by the base station and based on the code for determining having determined the set of the plurality of UEs as having the interference impact on one another, the first UE of the set of the plurality of UEs for receiving, in a first transmission time interval (TTI), downlink communications from the base station; and
code for scheduling, by the base station and based on the code for determining having determined the set of the plurality of UEs as having the interference impact on one another, the second UE of the set of the plurality of UEs for transmitting, in a second TTI that is adjacent in time to the first TTI, uplink communications to the base station.

27. The non-transitory computer-readable medium of claim 26, further comprising code for determining a first scheduling duration for the downlink communications for the first UE and a second scheduling duration for the uplink communications for the second UE based at least in part on the timing offset.

28. The non-transitory computer-readable medium of claim 26, further comprising code for requesting the second UE to transmit the reference signal over the symbol.

29. The non-transitory computer-readable medium of claim 28, wherein the code for requesting the second UE to transmit the reference signal over the symbol or the code for requesting the first UE to search for the reference signal transmitted by the second UE in the symbol requests based at least in part on detecting a change in one or more communication parameters related to the first UE or the second UE.

30. The non-transitory computer-readable medium of claim 29, wherein the one or more communication parameters includes at least one of a timing advance of the first UE or the second UE, a change in location of the first UE or the second UE, a determined consistency of demodulation performance of the first UE, or a comparison in channel state information feedback from the first UE when the second UE is present and not present.

* * * * *